Patented Sept. 24, 1940

2,215,573

UNITED STATES PATENT OFFICE 2,215,573

PRODUCTION OF SHAPED ARTICLES

Hans Beck and Eugen Dorrer, Ludwigshafen-on-the-Rhine, Germany, assignors, by mesne assignments, to General Aniline & Film Corporation, New York, N. Y., a corporation of Delaware No Drawing. Application October 20, 1936, Serial No. 106,538. In Germany October 23, 1935

4 Claims. (Cl. 18—47.5)

The present invention relates to a process of producing shaped articles.

When employing resins which are capable of being hardened, as for example phenol or urea resins, shaped articles made therefrom have a comparatively low elasticity and impact bending strength. Their resistance to water and electrical surface leakage currents is also frequently unsatisfactory. While shaped articles having considerably higher elasticity can be prepared with thermoplastic substances, as for example plastic masses from acetyl cellulose, polymerized styrene and the like, their stability to heat is but slight.

We have now found that shaped articles having especially high stability to heat, good bending strength and elasticity can be obtained by subjecting polymerization products of vinyl carbazole, i. e., polymerized vinyl carbazole as such or mixed polymerization products containing a preponderance of vinyl carbazole, to a treatment by which the molecules are oriented towards a definite direction, comminuting the resulting material and pressing it at temperatures at which no complete fusion takes place. Suitable mixed polymerization products for the present process are especially those from vinyl carbazole and styrene, but other mixed polymerization products, for example of vinyl carbazole and butadiene or vinyl ethers may also be employed.

The treatment to produce an orientation of the molecules of the polymerization products of vinyl carbazole may be effected in different ways, as for example by pressing the polymerized vinyl carbazole at temperatures of preferably more than 200° C. in an extrusion press out through nozzles, narrow slits or the like in the form of continuous bands, foils, rods or tubes or the like or rolling it out on hot rollers and if desired subjecting the resulting material to a special tensile stress in the direction of its outlet, preferably at a falling temperature, for example by passing it through a pair of rollers which are at the same temperature or at a temperature about 150° C. lower. The polymerized vinyl carbazole may also be pressed out into the form of short thin plates, rods and the like with a so-called injection casting machine, while preferably employing temperatures of more than 200° C. and heating the receptive injection casting mould to temperatures between about 50° and 200° C.

The substances thus treated may be comminuted in known comminution devices, such as cross-beater mills, crushers or the like. Finely fibrous masses are thus obtained which constitute the initial material for the pressing process proper.

The polymerized vinyl carbazole may be mixed before or during the said pretreatment with softening agents and/or fillers of a great variety of kinds, such as talcum, mica, graphite, pigments, asbestos, metal powders or wood flour. Or, these additions may be admixed with the finely fibrous material before the final pressing to the desired shaped articles. By pressing polymerized vinyl carbazole of different colorations it is possible to produce a great variety of color effects.

The finely fibrous products may also be made into tablets in known manner at ordinary or increased temperature and the tablets, in order to shorten the pressing process, preheated to temperatures up to about 225° C., preferably between 150° and 200° C.

In order to obtain special effects, insertions of fabric, metal wires, mica leaflets, asbestos masses and the like may be interposed. It is necessary to employ pressing temperatures of from about 180° to 250° C., but in all cases the temperature should be kept below that point at which a complete fusion occurs with the consequent destruction of the orientation of the molecules. This is usually the case at temperatures above 250° C.

The shaped articles are distinguished by great strength and good elasticity and also by smooth surfaces; in many cases they exhibit an effect similar to mother of pearl even without the employment of fillers, pigments or the like. Their strength and elasticity are considerably higher than those of shaped articles which have been obtained from polymerized vinyl carbazole by pressing in the usual manner. The pressed masses described may be used for the preparation of a great variety of articles, as for example for electrotechnical fittings, because they are stable to oil, waterproof, of very good stability to heat and against change of shape and have an excellent insulating power. They are also especially suitable for the preparation of apparatus or parts of apparatus for medicinal purposes and of useful articles of everyday life, as well as of ornamental articles.

The following example will further illustrate how the present invention may be carried out in practice but the invention is not restricted to this example.

*Example*

Polymerized vinyl carbazole is worked up in an injection casting machine into thin rods or plates, preferably of a thickness of only from 0.2 to 5 millimeters, and the said shaped articles are comminuted in a cross-beater mill to a finely fibrous mass similar to cotton wool. This is brought into tablet form and then pressed to the desired shaped article in a press at a temperature of from about 200° to 250° C. at the most. In this way rods, for example, are obtained which have an impact bending strength which is double or more than double that of similar rods which have been obtained from a polymerized vinyl carbazole which has not been correspondingly pretreated.

What we claim is:

1. A process of producing shaped articles which comprises subjecting polymerization products of vinyl carbazole to a treatment by which the molecules or orientated towards a definite direction comminuting the resulting material to fibers, packing said fibers and pressing the packed fibers at temperatures at which a partial but no complete fusion takes place.

2. A process of producing shaped articles which comprises rolling polymerization products of vinyl carbazole out on hot rollers, subjecting the rolled material to a strong tensile stress in the direction of outlet at a falling temperature, comminuting the resulting material to fibers, packing said fibers and pressing the packed fibers at temperatures at which a partial but no complete fusion takes place.

3. A process of producing shaped articles which comprises subjecting polymerization products of vinyl carbazole to a treatment by which the molecules are orientated towards a definite direction comminuting the resulting material to fibers, packing said fibers and pressing the packed fibers at temperatures of from 180 to 250° C., so that no complete fusion takes place.

4. A process of producing shaped articles which comprises subjecting mixed polymerization products derived from a mixture of preponderating amounts of vinyl carbazole with styrene to a treatment by which the molecules are orientated towards a definite direction comminuting the resulting material to fibers, packing said fibers and pressing the packed fibers at temperatures at which a partial but no complete fusion takes place.

HANS BECK.
EUGEN DORRER.